United States Patent [19]

Ziaylek, Jr.

[11] 4,288,189

[45] Sep. 8, 1981

[54] THREADED INSERT
[75] Inventor: Theodore Ziaylek, Jr., Yardley, Pa.
[73] Assignee: Yardley Products Corp., Yardley, Pa.
[21] Appl. No.: 65,490
[22] Filed: Aug. 10, 1979
[51] Int. Cl.³ .............................................. F16B 37/12
[52] U.S. Cl. ..................................... 411/180; 264/274;
264/278; 411/308; 411/423; 411/436
[58] Field of Search ............. 85/32 R, 46; 151/21 R,
151/22, 41.73; 264/274, 278; 411/436, 423, 103,
108, 308, 309, 310, 311, 178, 180

[56] References Cited

U.S. PATENT DOCUMENTS

| | | | |
|---|---|---|---|
| 671,274 | 4/1901 | Fischer | 85/46 X |
| 1,168,770 | 1/1916 | Wagner . | |
| 1,808,318 | 6/1931 | Pleisner . | |
| 2,140,919 | 12/1938 | Mushet . | |
| 2,293,930 | 8/1942 | Braendel | 85/47 |
| 2,297,923 | 10/1942 | Strong et al. | 264/278 |
| 2,311,231 | 2/1943 | Illsche | 151/41.73 X |
| 2,313,522 | 3/1943 | Dinnes . | |
| 2,352,982 | 7/1944 | Tomalis | 85/41 |
| 2,365,834 | 12/1944 | Olmstead . | |
| 2,543,100 | 2/1951 | Engh | 85/46 X |
| 2,560,951 | 7/1951 | Henderson et al. | 151/41.73 X |
| 2,788,045 | 4/1957 | Rosan | 151/22 |
| 2,788,046 | 4/1957 | Rosan | 151/22 |
| 2,823,574 | 2/1958 | Rosan | 85/47 |
| 2,896,285 | 7/1959 | Morin . | |
| 3,007,364 | 11/1961 | Dickie . | |
| 3,016,578 | 1/1962 | Rohe | 264/274 X |
| 3,110,212 | 11/1963 | Wing et al. . | |
| 3,163,197 | 12/1964 | Rosan et al. | 151/41.73 |
| 3,198,231 | 8/1965 | Bisbing | 151/41.73 |
| 3,216,304 | 11/1965 | James et al. | 85/72 |
| 3,276,499 | 10/1966 | Reusser | 151/41.73 |
| 3,319,690 | 5/1967 | Rosan et al. | 151/41.73 |
| 3,349,649 | 10/1967 | Mele . | |
| 3,384,142 | 5/1968 | Phelan | 151/41.73 |
| 3,405,596 | 10/1968 | Neuschotz | 85/47 |
| 3,411,398 | 11/1968 | Blakeley et al. | 85/72 |
| 3,451,080 | 6/1969 | McIntyre et al. . | |
| 3,477,335 | 11/1969 | Gold et al. | 85/62 |
| 3,492,908 | 2/1970 | Thurston | 85/47 |
| 3,493,254 | 2/1970 | Summerlin et al. . | |
| 3,530,921 | 9/1970 | Ernest | 151/41.73 |
| 3,566,739 | 3/1971 | Lebar | 85/72 |
| 3,719,342 | 3/1973 | Kupersmit . | |
| 3,727,254 | 4/1973 | Tidesley | 10/86 R |
| 3,771,272 | 11/1973 | Milhaly et al. | 151/41.73 X |
| 3,834,438 | 9/1974 | Ziaylek | 151/41.73 |
| 3,866,509 | 2/1975 | Kraus et al. | 85/32 R |
| 3,866,510 | 2/1975 | Eibes et al. | 85/47 |
| 3,884,006 | 5/1975 | Dietlein | 151/41.73 X |
| 4,051,591 | 10/1977 | Thompson | 264/274 X |

FOREIGN PATENT DOCUMENTS

| | | |
|---|---|---|
| 653957 | 2/1965 | Belgium . |
| 774860 | 1/1968 | Canada . |
| 2355166 | 5/1975 | Fed. Rep. of Germany ... 151/41.73 |
| 1227446 | 3/1960 | France ................................. 264/274 |
| 439636 | 9/1948 | Italy . |
| 268521 | 4/1927 | United Kingdom . |
| 640451 | 7/1950 | United Kingdom . |
| 647380 | 12/1950 | United Kingdom . |

Primary Examiner—Thomas J. Holko
Attorney, Agent, or Firm—John J. Kane; Frederick A. Zoda; Albert Sperry

[57] ABSTRACT

A threaded insert and method for making same which is particularly usable when fixedly positioned within a base material which itself is molded about the threaded insert, the threaded insert comprising a generally cylindrical body which is preferably knurled about the exterior thereof to provide a means for fixed securement between the insert and the surrounding base material, the cylindrical body including a central bore extending part way or completely through the insert, the central bore being threaded such that each individual thread includes a burnished end thereof such as to provide an arcuate surface immediately adjacent the mold or immediately adjacent the pin extending through the central bore to prevent the seepage of base material when under pressure during molding past the threads to foul the threads by having base material therein, the dimension of the burnishing on the tips of the threads being of such small dimension that the first placement of a threaded male member into the threaded central bore of the insert will immediately scrape off the burnished edges and thereby assume the normal threaded configuration, the threaded inserts being of either a closed end or open ended configuration which may further include a burnished edge at the uppermost edge of the outer knurled surface to also prevent the seepage of injected base material between this upper edge of the external surface and the head area of the pin.

8 Claims, 5 Drawing Figures

THREADED INSERT

BACKGROUND OF THE INVENTION

1. Field of the Invention

The present invention deals with the field of inserts which are formed of material harder than the base material whenever the standard base material is not of a proper material to form lasting means of securement of external elements thereto. In particular, when utilizing plastic, rubber, wooden or certain thin metal materials, it is desirable to place metal inserts therein to provide means for securement thereto.

The present invention provides an insert which is threaded on the interior thereof and which is particularly adaptable to be secured within soft base materials which are molded to form the desired configuration. The molding operation can be performed in any of the conventional manners such as injection or compression molding, etc. With such designs it is necessary that the molding process include the threaded insert itself as a portion of the mold such that the base material is molded about the threaded insert during the formation of the basic part itself.

With such configurations a problem has arisen especially with respect to open bottomed inserts since the soft material such as plastic when under pressure during molding will be urged to seep around the narrow contact points between the ends of the threads and the pin which is positioned within the central area of the threaded insert during the molding process.

2. Description of the Prior Art

In currently used configurations of threaded inserts which are usable in molded base materials a champfered edge is utilized at the point of intersection between the open ended insert and the pin which is held therein during molding of the part. This champfered edge actually tends to increase the amount of seepage by concentrating the pressure along a narrow area rather than attempting to prevent seepage of the plastic material under pressure by the narrow ended threads. A similar champfered edge is used currently at the intersection between the uppermost edge of the outer surface of the threaded insert and the mold position thereagainst or the head of the pin which is positioned thereagainst. In either configuration the champfered edge serves to increase the amount of flowby of base material being molded under pressure thereagainst. In order to make sure that the threads are clean with such champfered edge designs it is necessary to perform an additional step of cleaning the threads by the passing of a threaded male member therein after the formation of the molded part. This is a costly and time-consuming operation which has been rendered unnecessary by the design of the present invention.

SUMMARY OF THE INVENTION

The present invention provides a threaded insert which is particularly adaptable for usage when fixedly positioned within a base material which is molded about the insert during formation thereof. Such a threaded insert includes a cylindrical body having a securement means such as a knurled surface about the exterior thereof.

The cylindrical body further defines a central bore extending either partly or completely therethrough. This central bore includes a thread means defined on the interior wall thereof.

Each of the thread means includes an upper thread face extending centrally inwardly and outwardly from the walls of the central bore and a lower thread face extending centrally inwardly and upwardly from the walls of the central bore. The innermost edges of the upper and lower thread faces are joined by a thread end which extends generally in a direction parallel with respect to the axis of the central bore. The edge of intersection between the thread end and the upper thread face is defined as the upper thread edge and the edge of intersection between the thread end and the lower thread face is defined as the lower thread edge.

In order to minimize the flow of plastic material into the threads of open ended inserts it is desirable to provide an upwardly extending section on the upper thread face directly adjacent the upper thread edge. This upwardly extending section will form a generally upwardly facing concave surface when viewed in combination with the adjacent area of the upper thread face which actually extends centrally inward and downward from the wall of the central bore. This generally concave upwardly facing surface will prevent the passage of plastic or other soft base material which is molded. The preventing of the flow of this material past this upper thread edge minimizes the fouling of the threads during high pressure molding.

In a similar manner the lower thread face includes a downwardly extending section directly adjacent the lower thread edge to prevent the flow of base material thereby during material injection. This downwardly extending section when viewed in combination with the immediately adjacent centrally inwardly and upwardly extending lower thread face will provide a downwardly facing arcuate section directly adjacent the lower thread edge on every thread within the interior of the threaded insert to prevent any base material when under high pressure molding from flowing between this thread end and pin positioned within the central bore during molding.

Furthermore, the uppermost edge of the outer surface of the cylindrical body should include an outwardly facing concave surface peripherally therearound to prevent the flow of base material between the uppermost edge of the outer surface of the cylindrical body and the mold or head of the pin during molding of the base material part.

Therefore, with an open ended design the combination of the outwardly facing concave surface at the top of the outermost edge of the outer surface of the cylindrical body in combination with the slightly arcuate sections the facing upwardly and downwardly at each lower thread edge and upper thread edge, respectively, provides an overall design which definitely minimizes and usually completely prevents the flow of any plastic material to foul the threads of the threaded insert.

The slightly turned over edges of the thread ends is provided by burnishing of the threads. This burnishing is accomplished by the insertion of a pin into the central bore which is of a diameter slightly greater than the diametric distance between the thread ends. Therefore, there is a slight burnishing or turning over of the tips of the threads in both directions. This is a very slight configuration, however, it is proven to be sufficient to prevent seepage of molded base material thereby. The threads will still come within the standard specifications of various governmental requirements and the initial placement of a threaded male member into the threaded insert will smooth off the threads and remove any remains of the slightly burnished ends. From this point on, the threaded insert will function in the same fashion as any other threaded insert.

It is preferable that the external surface of the cylindrical body be knurled in order to facilitate securement between the threaded insert itself and the molded base material such as plastic or the like.

It is an object of the present invention to provide a threaded insert which may be fixedly secured within the base material of a molded part.

It is an object of the present invention to provide a threaded insert which may be inserted into a molded base material at the time of molding.

It is an object of the present invention to provide a threaded insert which minimizes the fouling of threads within a central bore thereof by providing specially located arcuate surfaces at the seams between the insert itself and the mold form.

It is an object of the present invention to provide a threaded insert which defines a central bore extending completely therethrough which prevents fouling of the internal threads thereof.

It is an object of the present invention to provide a threaded insert having a central bore extending only partially therethrough which prevents the fouling of the threads therein by the seepage of molded soft base material within the central bore thereof.

It is an object of the present invention to provide a threaded insert which includes an arcuate section at the uppermost edge of the outer surface which prevents the seepage of molded base material thereby during the molding process.

It is an object of the present invention to provide a threaded insert which maintains uncontaminated internal threads merely by the burnishing of the innermost thread ends within the central bore.

It is an object of the present invention to provide a threaded insert which prevents fouling of the internal threads thereof which may be formed in exactly the same amount of time as a threaded insert not including the seepage prevention design characteristic.

It is an object of the present invention to provide a threaded insert which prevents contamination of the internal threads thereof which requires the exact same cost as threaded inserts manufactured heretofore of the same design but without utilizing the burnishing characteristic of the present invention.

It is an object of the present invention to provide a threaded insert having slightly burnished or turned over thread edges which still come within the limitations of the National Bureau Standards with regard to tolerances of thread dimensions.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
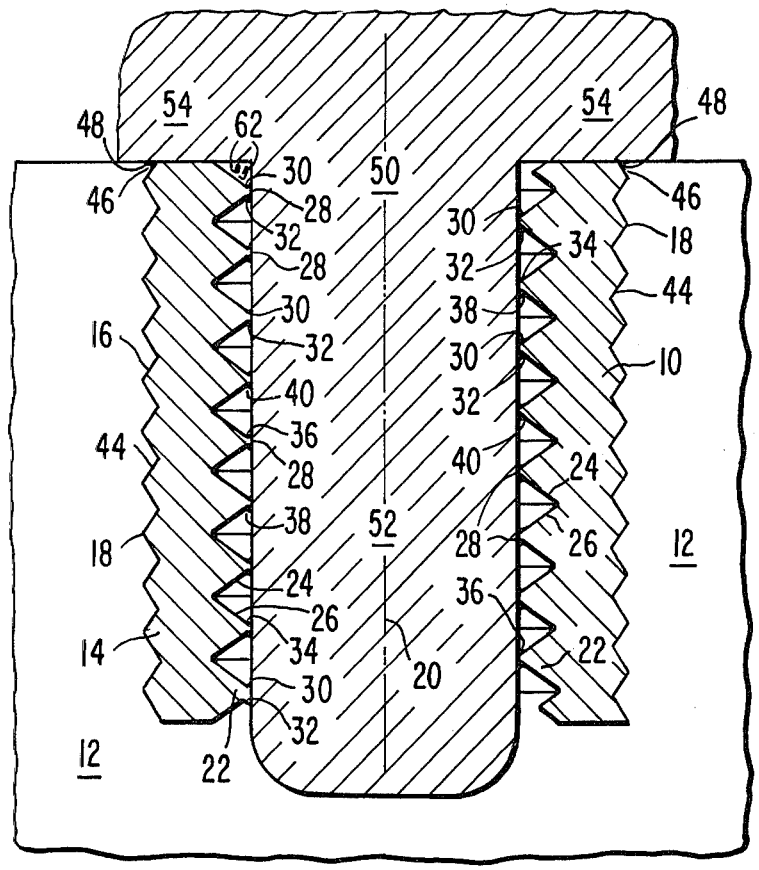
FIG. 1 is a cross-sectional view of an embodiment of an open ended threaded insert of the present invention in place within the molded base material and with the pin remaining therein.

The present invention provides a threaded insert 10 which is specifically adapted to be used fixedly secured within a base material which is molded to form the part made of the base material 12. Threaded insert 10 includes a cylindrical body 14 having a securement means 16 located on the outer surface 44 thereof. This securement means 16 is adapted to secure the threaded insert 10 in place within the base material 12. Preferably the securement means 16 will take the form of a knurled surface 18. In this manner the chances of loosening of the threaded insert 10 within the base material 12 will be minimized.

Figure 3:
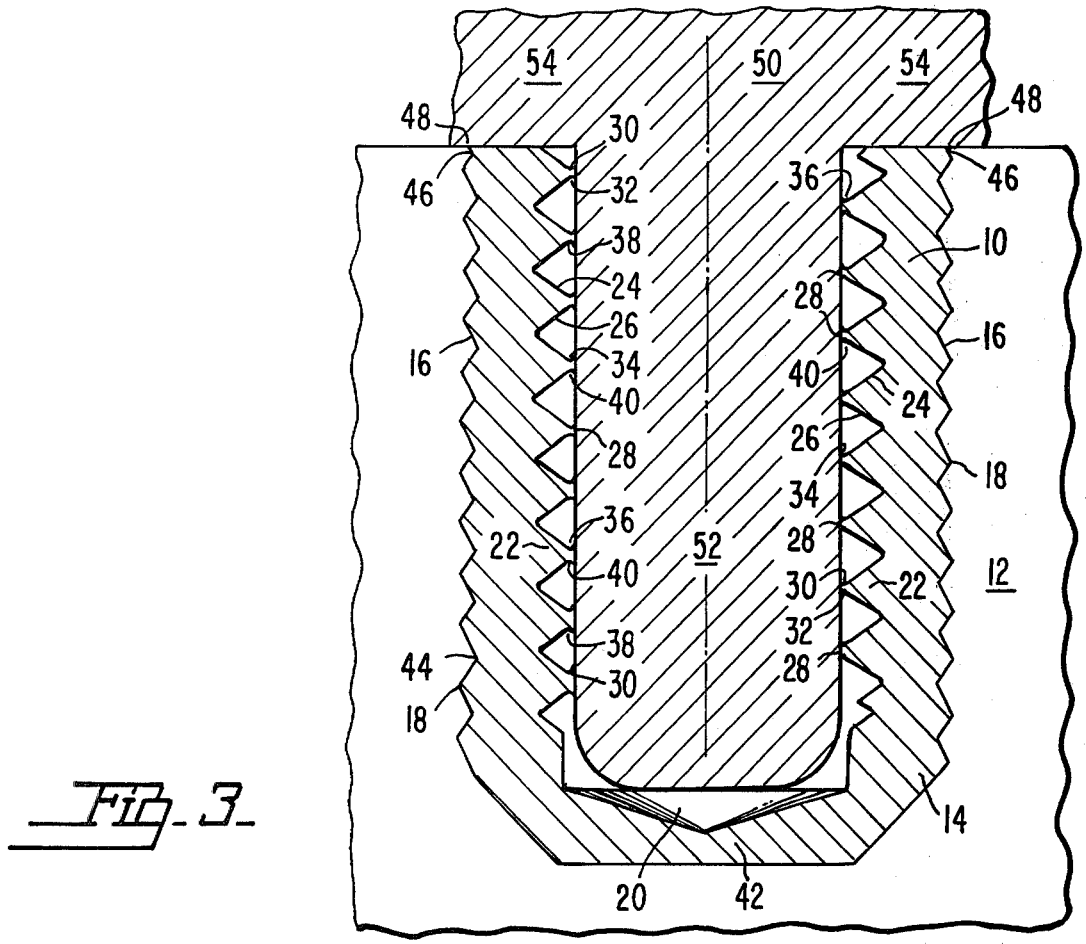
FIG. 3 is a cross-sectional view of an alternative configuration of an embodiment of the threaded insert of the present invention.

The insert 10 may define a central bore 20 extending fully therethrough or may define a central bore 20 extending only partly therethrough and with such a configuration a closed bottom wall 42 as shown in FIG. 3 will be included in the configuration of insert 10.

Central bore 20 may define thread means 22 on the interior surface thereof. Each individual thread of thread means 22 will include an upper thread face 24 and a lower thread face 26. Upper thread face 24 will extend centrally inwardly and downwardly from the wall of the central bore 20 and the lower thread face 26 will extend centrally inwardly and upwardly from the wall of the central bore 20. A thread end 28 will extend from the innermost end of the upper thread face 24 to the innermost end of the lower thread face 26. This thread end 28 will extend generally in the direction approximately parallel to the axis of the central bore. The edge of intersection between the upper thread face 24 and the thread end 28 will comprise the upper thread edge 30. The edge of intersection between the lower thread face 26 and the thread end 28 will comprise the lower thread edge 32.

In the formation of the threaded insert 10 of the present design a burnishing step will be included which will form an upwardly extending section 34 immediately adjacent to the upper thread edge 30. In this manner the upwardly extending section 34 in combination with the immediately adjacent section of the upper thread face 24 which extends downwardly will form an upwardly facing generally arcuate section 36. This arcuate section 36 will prevent the passage of molded material thereby during molding of the part of base material 12.

The lower thread face 26 will include a downwardly extending section 38 therein immediately adjacent to the lower thread edge 32. This downwardly extending section 38 in combination with the immediately adjacent area of the lower thread face 26 will form a downwardly facing arcuate section 40. In this manner this downwardly facing arcuate section 40 will minimize passage of plastic or other soft base material when molding of the part is performed.

To minimize the flow of base material during molding past the upper edge of the insert 10 an outwardly facing concave surface 46 may be positioned peripherally around the uppermost edge 48 of the outer surface 44.

During formation of the threaded insert 10 a pin 50 will be utilized to burnish the thread ends 28. This pin will preferably be of a material harder than the material of the insert in order to accomplish this burnishing and will be of a diameter slightly greater than the diametric distance between the thread ends 28 of the thread means 22. This will cause slight burnishing or turning over of the upper and lower thread edges 30 and 32 to thereby form the upwardly facing arcuate section 36 and the downwardly facing arcuate section 40. Generally the pin will include a pin shaft 52 which extends directly into the central bore 20 and a pin head 54 which extends outwardly above the uppermost edge 48 of the outer surface 44.

Figure 4:
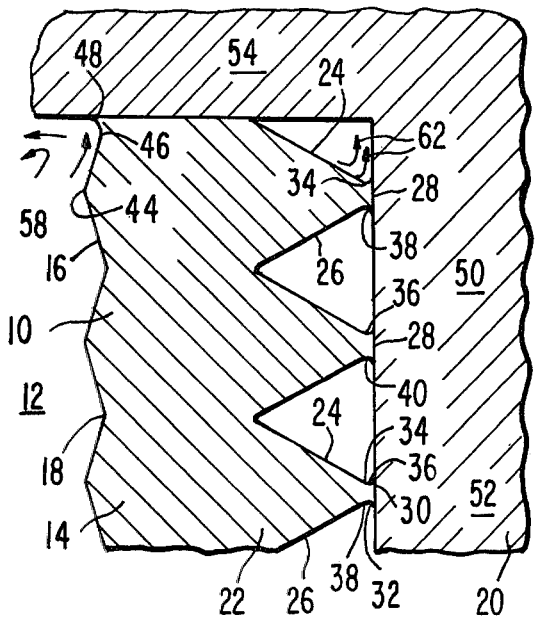
FIG. 4 is an illustration of the flow of base material against the uppermost edge of an embodiment of the outer surface of the threaded insert of the present invention.

With the threaded insert 10 of the present invention it is desirable to form the part of the base material 12 simultaneously with the placement of the threaded insert 10 therein. Therefore the threaded insert 10 must be placed within the mold during the molding process. This raises a problem with respect to the seepage of base material 12 past the uppermost edge of the external surface of the insert 10. Normally this uppermost edge 48 will be in contact with a portion of the mold or as shown in FIGS. 3 and 4 will be in contact with the pin head 54. As the material is caused to flow into the mold it will be urged against the point of contact between uppermost edge 48 and pin head 54. Due to the outwardly facing concave surface 46 the base material 12 will be caused to flow in the direction shown by flow arrows 58. The curved surface will minimize the concentration of pressure against the seam between the threaded insert and the pin head 54 and will thereby cause the pressure and base material to be urged away from the seam as shown by the movement of flow arrows 58. If by chance this seam does allow a small amount of base material to seep thereby, then the upwardly facing arcuate section 36 of the top thread as shown in FIG. 54 will cause the base material 12 which is under pressure to be moved away from the seam between this uppermost thread and the pin shaft 52 as shown by flow arrows 62. This configuration for the uppermost edge 48 of outer surface 44 is usable with both the open ended threaded insert and the closed end threaded insert which would include the closed bottom wall 42. The open configuration is shown in FIG. 1 and the closed end configuration is shown in FIG. 3.

Figure 2:
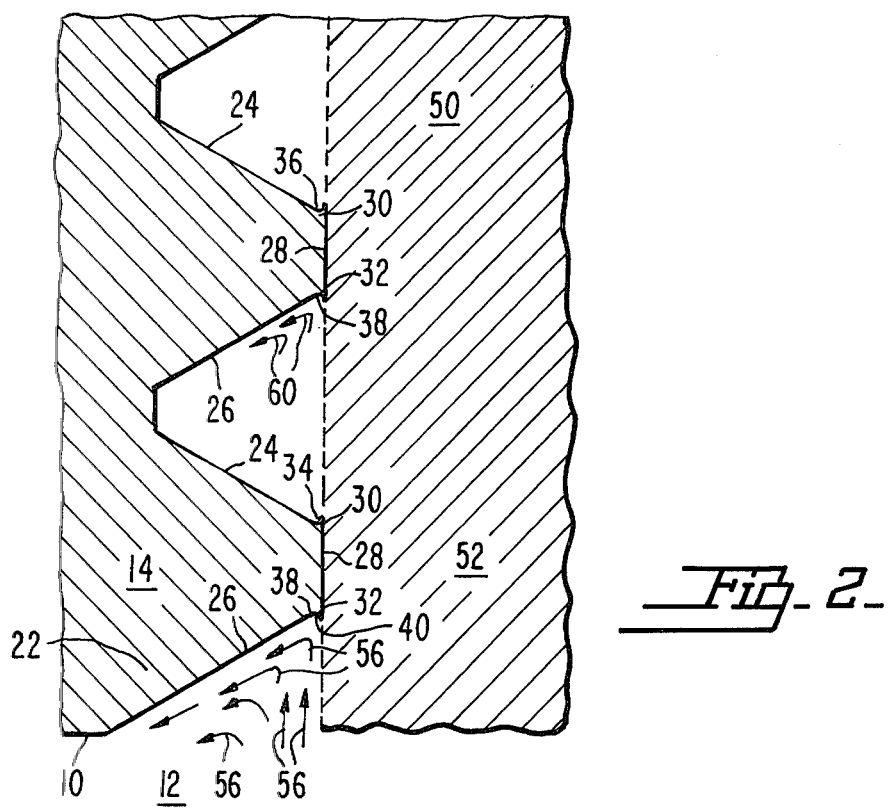
FIG. 2 is a cross-sectional view of the configuration shown in FIG. 1 closely illustrating the flow of base material against the threaded insert and pin during molding of the base material.

With the open ended configuration as shown in FIG. 1 another area of possible seepage is presented to the pressurized base material 12. This is the point of contact between the shaft 52 of pin 50 and the thread ends 28. As shown in FIG. 2 the downwardly facing arcuate section 40 will cause the base material 12 which is under pressure during molding to be urged away from the seam between the pin shaft 52 and the thread end 28 in the direction indicated by flow arrows 56. If by chance some base material under pressure is capable of moving past the point of contact between the lowermost thread end 28 and pin shaft 52 then the next uppermost thread which also includes the downwardly facing arcuate section 40 will cause the base material 12 which is under pressure to be urged away from the seam between this next upper thread end 28 and the pin shaft 52. This movement of base material is shown by flow arrows 60.

Figure 5:
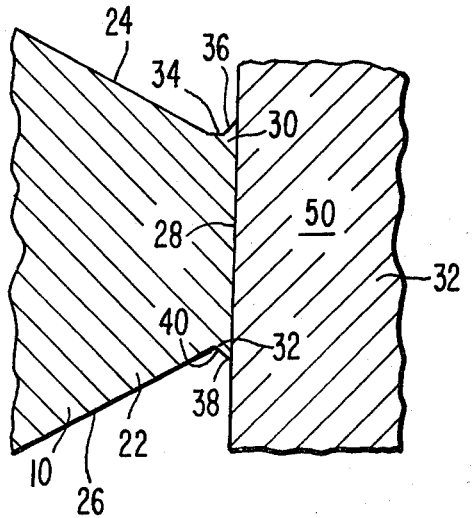
FIG. 5 is a close-up, cross-sectional view of an embodiment of the thread end of the present invention shown in contact with the pin to illustrate the upwardly and downwardly extending sections.

It should be appreciated that the actual configuration of the upwardly facing arcuate sections 36, the downwardly facing arcuate sections 40 and the outwardly facing concave surfaces 46 can be of any convenient design which prevents a generally arcuate surface. Any design achieved by such burnishing as in the present invention would be advantageous. Three alternative configurations are shown in the drawings of the present invention. In particular, FIG. 2 shows a smoothly arcuate contour for the arcuate sections. Whereas FIG. 5 illustrates as the lower arcuate surface two completely flat surfaces joining at a point of intersection. Also the uppermost arcuate surface shown in FIG. 5 shows the intersection of three completely flat surfaces to present an approximately arcuate section. Any configuration for this burnished edge which will divert the pressurized base material away from the seam between the mold or pin and the threaded insert 10 itself will help to minimize the fouling of the threads within the central bore 20 of threaded insert 10.

While particular embodiments of this invention have been shown in the drawings and described above, it will be apparent, that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A threaded insert, particularly usable fixedly positioned in a base material which is molded, comprising a generally cylindrical body including a securement means about the outer surface thereof to facilitate the securing of the threaded insert to the surrounding molded base material, said cylindrical body defining a vertically extending central bore therethrough including a thread means on the walls thereof, each of said thread means comprising:
   (a) an upper thread face extending centrally inwardly and downwardly from the walls of said central bore;
   (b) a lower thread face extending centrally inwardly and upwardly from the walls of said central bore;
   (c) a thread end extending from the innermost end of said upper thread face to the innermost end of said lower thread face, said thread end extending in a direction generally parallel to the axis of said central bore;
   (d) an upper thread edge defined along the inner section of said upper thread face and said thread end;
   (e) a lower thread edge defined along the intersection of said lower thread face and said thread end;
said upper face including an upwardly extending section directly adjacent said upper thread edge to prevent flow of base material thereby during material molding, said lower thread facing including a downwardly extending section directly adjacent said lower thread edge to prevent flow of base material thereby during material molding.

2. The threaded insert as defined in claim 1 wherein said central bore extends completely through said cylindrical body.

3. The threaded insert as defined in claim 1 wherein said central bore extends only partly through said cylindrical body wherein said body defines a closed bottom wall.

4. The threaded insert as defined in claim 1 wherein said securement means comprises a knurled surface about the exterior of the threaded insert.

5. The threaded insert as defined in claim 1 wherein said upwardly extending section and the adjacent area of said upper thread face define an upwardly facing arcuate section.

6. The threaded insert as defined in claim 1 wherein said downwardly extending section and the adjacent area of said lower thread face define a downwardly facing arcuate section.

7. The threaded insert as defined in claim 1 further comprising an outwardly facing concave surface peripherally located all about the uppermost edge of the outer surface of said cylindrical body to prevent flow of base material during molding between the uppermost edge of the outer surface of the cylindrical body and the mold.

8. A threaded insert, particularly usable fixedly positioned in a base material which is molded, comprising a generally cylindrical body including a securement means about the outer surface thereof to facilitate the securing of the threaded insert to the surrounding molded base material, said securement means comprising a knurled surface about the outside of said cylindrical body, said cylindrical body defining a vertically extending central bore therethrough including thread means on the walls thereof, each of said thread means comprising:

(a) an upper thread face extending centrally inwardly and downwardly from the walls of said central bore;

(b) a lower thread face extending centrally inward and upward from the walls of said central bore;

(c) a thread end extending from the innermost end of said upper thread face to the innermost end of said lower thread face, said thread end extending in a direction generally parallel to the axis of said central bore;

(d) an upper thread edge defined along the intersection of said upper thread face and said thread end;

(e) a lower thread edge defined along the intersection of said lower thread face and said thread end; and (f) an outwardly facing concave surface peripherally located all about the uppermost edge of the outer surface of said cylindrical body to prevent flow of base material between the uppermost edge of the outer surface of the cylindrical body and the mold during molding; and said upper thread face including an upwardly facing arcuate section directly adjacent said upper thread edge to prevent flow of base material thereby during material molding, said lower thread face including a downwardly facing arcuate section directly adjacent, said lower thread edge to prevent flow of base material thereby during material molding.

* * * * *